(12) United States Patent
Campen et al.

(10) Patent No.: US 11,445,664 B2
(45) Date of Patent: Sep. 20, 2022

(54) AUGER ASSEMBLY FOR HARVESTING MACHINE

(71) Applicant: Deere & Company, Moline, IL (US)

(72) Inventors: Thomas M. Campen, Davenport, IA (US); Douglas A. Nimrick, Cambridge, IL (US); Kurt C. Senner, Galesburg, IL (US); Douglas G. Temple, Fulton, IL (US); Daniel J. Cox, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 628 days.

(21) Appl. No.: 16/408,878

(22) Filed: May 10, 2019

(65) Prior Publication Data

US 2020/0352104 A1 Nov. 12, 2020

(51) Int. Cl.
*A01D 90/10* (2006.01)
*B65G 67/24* (2006.01)
(Continued)

(52) U.S. Cl.
CPC .......... *A01D 90/10* (2013.01); *B23K 26/0823* (2013.01); *B23K 26/282* (2015.10);
(Continued)

(58) Field of Classification Search
CPC ............ B23K 26/0823; B23K 2101/08; B23K 2101/06; B23K 26/282; B65G 33/14; B65G 2814/0326; B65G 67/24; A01D 41/1217
See application file for complete search history.

(56) References Cited

U.S. PATENT DOCUMENTS 2,220,284 A * 11/1940 Roemer .................... B60B 3/04
301/63.104
4,694,137 A 9/1987 Hawkins et al.
(Continued)

FOREIGN PATENT DOCUMENTS

| DE | 3832728 A1 | 4/1989 |
| EP | 0465106 A2 | 1/1992 |
| JP | 2017129512 A | 7/2017 |

OTHER PUBLICATIONS

Photograph of auger housing with conventional exterior welding, Deere & Company, undated, admitted prior art.
(Continued)

*Primary Examiner* — Dana Ross
*Assistant Examiner* — Kuangyue Chen
(74) *Attorney, Agent, or Firm* — Klintworth & Rozenblat IP LLP (57) ABSTRACT

An auger assembly for transporting material for an agricultural work vehicle formed by an auger and a housing arrangement having an interior that houses the auger such that rotation of the auger within the housing arrangement is configured to transport the material through the housing arrangement. The housing arrangement includes a series of tube portions including at least a first and a second tube portion, each respective tube portion of the series of tube portions having a first and second end, an inner and outer surface, and a thickness between the inner and outer surfaces; and at least one mounting flange structure, including a first mounting flange structure secured to the outer surface of the first tube portion by a first laser weld extending from the inner surface of the first tube portion, through the thickness of the first tube portion, and into the first mounting flange structure.

13 Claims, 5 Drawing Sheets

(51) Int. Cl.
*B23K 26/08* (2014.01)
*B65G 33/14* (2006.01)
*B23K 26/282* (2014.01)
B23K 101/06 (2006.01)
B23K 101/08 (2006.01)

(52) U.S. Cl.
CPC ............ *B65G 33/14* (2013.01); *B65G 67/24* (2013.01); *B23K 2101/06* (2018.08); *B23K 2101/08* (2018.08); *B65G 2814/0326* (2013.01)

(56) References Cited

U.S. PATENT DOCUMENTS

| | | | | |
|---|---|---|---|---|
| 5,628,449 | A * | 5/1997 | Onuma | B23K 35/3086 |
| | | | | 228/262.41 |
| 10,023,389 | B1 * | 7/2018 | Priepke | B65G 21/14 |
| 2006/0163221 | A1 | 7/2006 | Makase et al. | |

OTHER PUBLICATIONS

Photograph of auger housing with conventional exterior welding, Claas KGaA mbH., undated, admitted prior art.

* cited by examiner

AUGER ASSEMBLY FOR HARVESTING MACHINE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to agricultural harvesting machines, such as combine harvesters, and more specifically a laser welded auger assembly of a grain unloading system.

BACKGROUND OF THE DISCLOSURE

Agricultural harvesting machines include headers designed to cut and collect crops from the ground. In a combine harvester, the harvesting machine threshes the crops, separates the grain from other material, cleans the grain, stores the grain in a grain tank, and eventually, transfers the grain from the grain tank to an accompanying vehicle such as a grain cart or grain wagon. Generally, harvested material is transferred within and off of the harvesting machine with an unloading system having an auger assembly, such as an unloading auger assembly that transfers the harvested material off of the harvesting machine. The unloading auger assembly is formed by an auger within a housing arrangement that extends away from harvesting machine. The design, assembly, and durability associated with the auger assembly may be challenging due to the weight, length, and position of the auger housing arrangement.

SUMMARY OF THE DISCLOSURE

The disclosure provides an unloading auger assembly for a harvesting machine and method for the manufacture and/or assembly of the unloading auger assembly.

In one aspect, the disclosure provides an auger assembly for transporting material for an agricultural work vehicle formed by an auger and a housing arrangement having an interior that houses the auger such that rotation of the auger within the housing arrangement is configured to transport the material through the housing arrangement. The housing arrangement includes a series of tube portions including at least a first tube portion and a second tube portion, each respective tube portion of the series of tube portions having a first end, a second end, an inner surface, an outer surface, and a thickness between the inner surface and the outer surface; and at least one mounting flange structure, including a first mounting flange structure secured to the outer surface of the first tube portion by a first laser weld extending from the inner surface of the first tube portion, through the thickness of the first tube portion, and into the first mounting flange structure.

In another aspect, the disclosure provides a method of forming a housing arrangement of an auger assembly for transporting material on an agricultural work vehicle. The method includes providing a first tube portion having a first end, a second end, an inner surface, an outer surface, and a thickness between the inner surface and the outer surface; positioning a first mounting flange structure on the outer surface of the first tube portion proximate to the first end; arranging a laser apparatus with a laser device proximate to the first end of the first tube portion such that the laser device is oriented toward the inner surface of the first tube portion; and generating a laser beam with the laser device onto the inner surface of the first tube portion to form a first laser weld extending from the inner surface of the first tube portion, through the thickness of the first tube portion, and into the first mounting flange structure.

In further aspect, the disclosure provides an auger assembly for transporting material for an agricultural work vehicle. The auger assembly includes an auger and a housing arrangement having an interior that houses the auger such that rotation of the auger within the housing arrangement is configured to transport the material through the housing arrangement. The housing arrangement includes a series of tube portions including at least a first tube portion having a first end, a second end, an inner surface, an outer surface, and a first thickness between the inner surface and the outer surface, wherein the first tube portion is formed from high-strength steel; and at least one mounting flange structure, including a first mounting flange structure having an axial portion secured to the outer surface of the first tube portion by a first laser weld and a radial section extending from the axial section, wherein the axial section of the first mounting flange structure has a second thickness that is greater than the first thickness of the first tube portion.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example implementations of the disclosed harvester and associated unloading auger assembly, as well as a method for manufacturing the same, as shown in the accompanying figures of the drawings described briefly above. Various modifications to the example implementations may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "forward," "front," "aft," "rear," "lateral," "horizontal," and "vertical" may be used. Such terms are defined, at least in part, with respect to the direction in which the work vehicle or implement travels during use. For example, the terms "forward" and "front" (including "fore" and any further derivatives or variations) refer to a direction corresponding to the primary direction of travel, while the term "aft" and "rear" (and derivatives and variations) refer to an opposing direction. The term "longitudinal axis" may also reference an axis extending in fore and aft directions. By comparison, the term "lateral axis" may refer to an axis that is perpendicular to the longitudinal axis and extends in a horizontal plane; that is, a plane containing both the longitudinal and lateral axes. The term "vertical," as appearing herein, refers to an axis or a direction orthogonal to the horizontal plane containing the fore-aft and lateral axes.

Agricultural harvesters use internal mechanisms to thresh, separate, and clean grain. The harvester then elevates and temporarily stores the grain in a bin, tank, or other grain collection source, and the bin is then unloaded using an unloading system. In one example, the unloading system includes an unloading auger elbow that may be coupled to receive grain from a grain source and a generally horizontal unloading auger assembly that receives the grain from the auger elbow and transfers the grain out of the harvester into a receptacle such as a grain cart. The unloading auger assembly has a plurality of parts and manufacturing steps. Traditionally, the unloading auger assembly includes tube portions onto which flange structures are mounted. The tube portions are bolted together via the flange structures.

The unloading auger housing arrangements may be difficult and expensive to manufacture and maintain due to the overall weight, particularly at the interface between the elbow and the housing arrangement and between portions of the housing arrangement. If the flanges are not properly mounted, wear rates are increased and prone to failure along their welded joints.

As a result, it may be generally advantageous to reduce the weight of the housing arrangement, such as by using thinner materials to form the tube portions of the housing arrangement. In the description below, the tube portions may be formed by a high-strength steel. However, the use of this material complicates the manufacturing process. In conventional arrangements, the flange structures that enable tube portions to be assembled into a housing arrangement are secured to the respective tube portions with metal inert gas (or MIG) welding. Typically, MIG welding includes the following example steps; providing an arc is shielded by an external gas; feeding a consumable additive material from a spool to the arc zone; heating and melting work pieces edges and the consumable additive material by the arc; and supplying the fused material to the surfaces of the work pieces to fill the weld pool and form joint. However, it has been determined that MIG welding may be unsuitable for mounting flanges on the tube portions, particularly when the tube portion is formed by high-strength steel. As described below, mounting flange structures may be secured to the tube portions of the housing arrangement with laser welding.

Generally, laser welding (or laser beam welding) is a welding technique used to join pieces of metal through the use of a laser beam. Typically, the beam provides a concentrated energy source that is converted into heat to fuse the materials, allowing for narrow, deep welds and high welding rates as a result of relatively small heat-affected zones and high heating and cooling rates. The process is also particularly suitable for high volume applications using automation. As set forth in the disclosure below, it is particularly advantageous to use a laser welding process for the housing arrangement portions in which the laser weld originates from the inner surface of the tube portion and penetrates through the tube portion and into the flange structure (e.g., inside out). Typically, the flange structures are secured to the outer surface of the tube structure from outside the tube. However, considering the thinner, lightweight nature of the tube portion, it is particularly beneficial to weld from the interior of the tube portion. Otherwise, a prohibitive amount of energy may be required to weld through the thicker material of the flange structure. Moreover, using conventional welding processes on the high-strength material may adversely impact the characteristics of the material (e.g., by annealing and reducing the strength of the steel). Additional advantages of laser welding include the ability to form a weld that does not require additional or filler material and results in relatively small heat-affected zones. Accordingly, laser welding in the manner set forth below may complicate manufacturing of the housing arrangement, but overall, it improves the quality of the welds and the housing arrangement.

Accordingly, the present disclosure provides an improved unloading auger assembly and method for manufacturing the unloading auger assembly. The auger assembly discussed herein may be formed by tube portions joined together by flange structures mounted on the outer surface of the tube portions with laser welds that extend from the inner surfaces of the tube portions. In addition, the present disclosure provides a welding system that is particularly suitable for laser welding the mounting flange structures on the tube portions.

Figure 1:
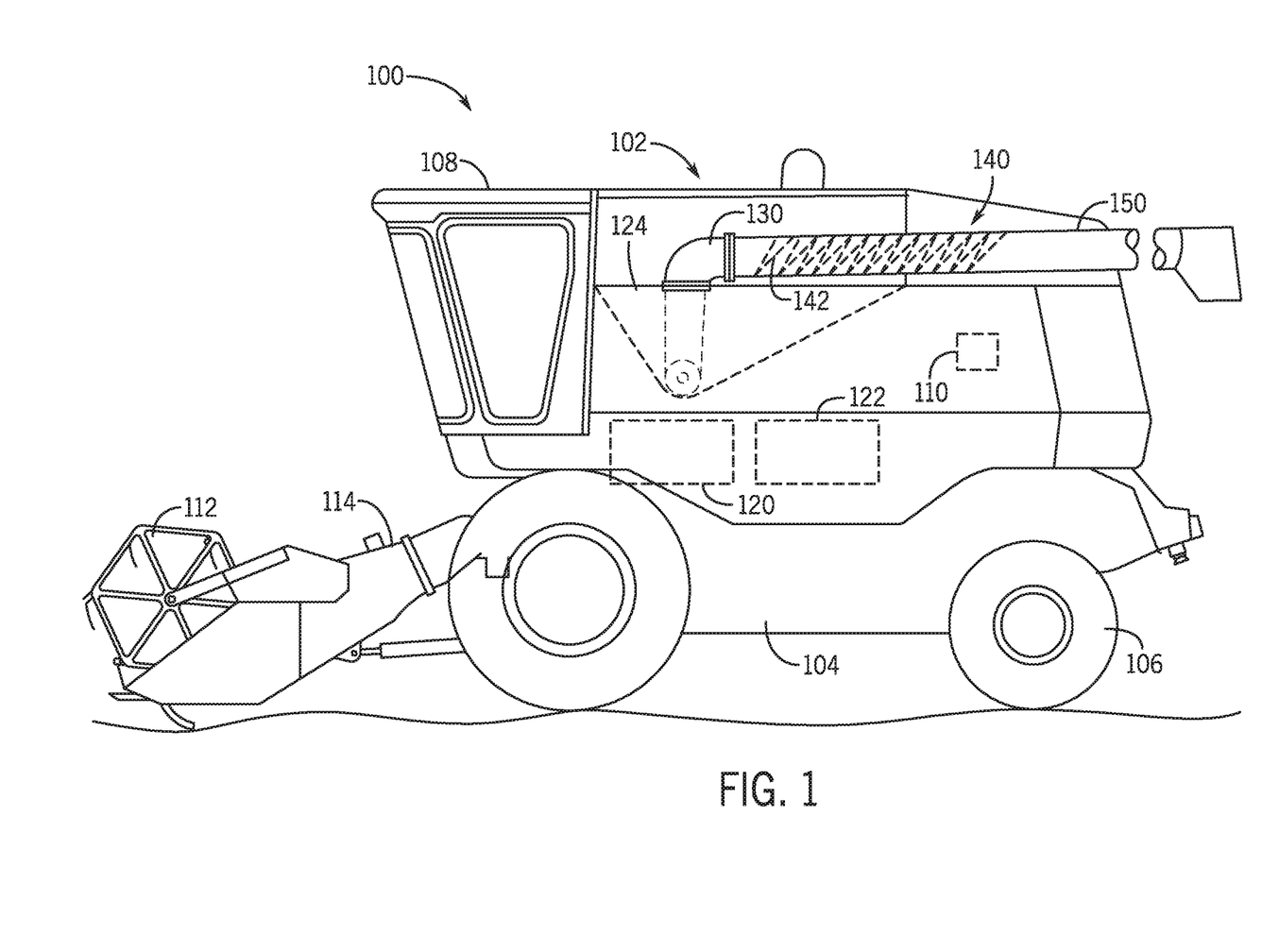
FIG. 1 is a schematic elevation view of a harvesting machine in the form of an example agricultural combine harvester that includes a grain unloading system with an auger assembly according to this disclosure.

Reference is initially made to FIG. 1, which is a schematic elevation view of a harvesting machine in the form of an example agricultural combine harvester 100 that includes a grain unloading system 102 according to this disclosure. In one implementation, harvester 100 configured to harvest and/or unload a particular type of crop and/or grain. In other implementations, harvester 100 is adaptable to harvest and/or unload different types of crops or grains. Examples of different types of grain that may be harvested by such a harvester 100, include but are not limited to, corn, soybeans, oats, wheat, sorghum, barley and the like.

As shown, the example combine harvester 100 includes a chassis 104 with ground-engaging wheels 106 or tracks. The wheels 106 are rotatably mounted to the chassis 104 and engage with the ground to propel the combine harvester 100. An operator cab 108, also mounted to the chassis 104, houses an operator as well as various devices to control the harvester 100, such as one or more operator input devices and/or display devices. An engine 110 and/or other power sources are provided to power the wheels and other systems of the harvester 100.

A header 112 is mounted at the front of the chassis 104 of the combine harvester 100 to cut and gather crop material from a field. The header 112 is supported by a feederhouse 114 pivotally mounted to the chassis 104 that transports cut crop material from the header 112 into the body of the combine harvester 100. The crop material may be processed within the combine harvester 100 in any suitable manner, including one or more threshing devices or separators 120 (schematically shown) in which grain is separated from material other than grain (MOG) and cleaning subsystem 122 (schematically shown) that transfers the grain into a grain tank 124 or other volume for temporarily containing and storing grain that has been harvested prior to the harvested grain being unloaded.

As referenced above, the harvester 100 includes the grain unloading system 102 that unloads harvested grain from harvester 100 into a grain carrier (not shown). In one implementation, the grain unloading system 102 unloads harvested grain into a grain carrier positioned alongside harvester 100 while harvester 100 is stationary or into a grain carrier positioned alongside harvester 100 while the harvester 100 is traversing a field or even while harvester 100 is continuing to harvest the crops from the field.

In one example, grain unloading system 102 includes an elbow 130 secured to the chassis 104 of the harvester 100 and an auger assembly 140 mounted to the elbow 130. Generally, the elbow 130 may be coupled to receive grain from a grain source (not shown) for transfer to the auger assembly 140. As described in greater detail below, the auger assembly 140 includes a helical auger 142 (schematically shown) positioned within a housing arrangement 150 such that rotation of the auger 142 within the housing arrangement 150 functions to transfer the grain through the length of the auger assembly 140. The auger 142 may be driven by a motor, engine or other actuator (not shown) to convey grain from the harvester 100 at an appropriate speed.

The auger assembly 140 extends from harvester 100 for discharging or unloading grain into an appropriate receptable. In some implementation, the auger assembly 140 is movably supported by suitable mechanisms for raising and lowering the auger assembly 140. Additional details regarding the assembly and manufacture of the housing arrangement 150 of the auger assembly 140 are provided below.

Figures 2, 3:
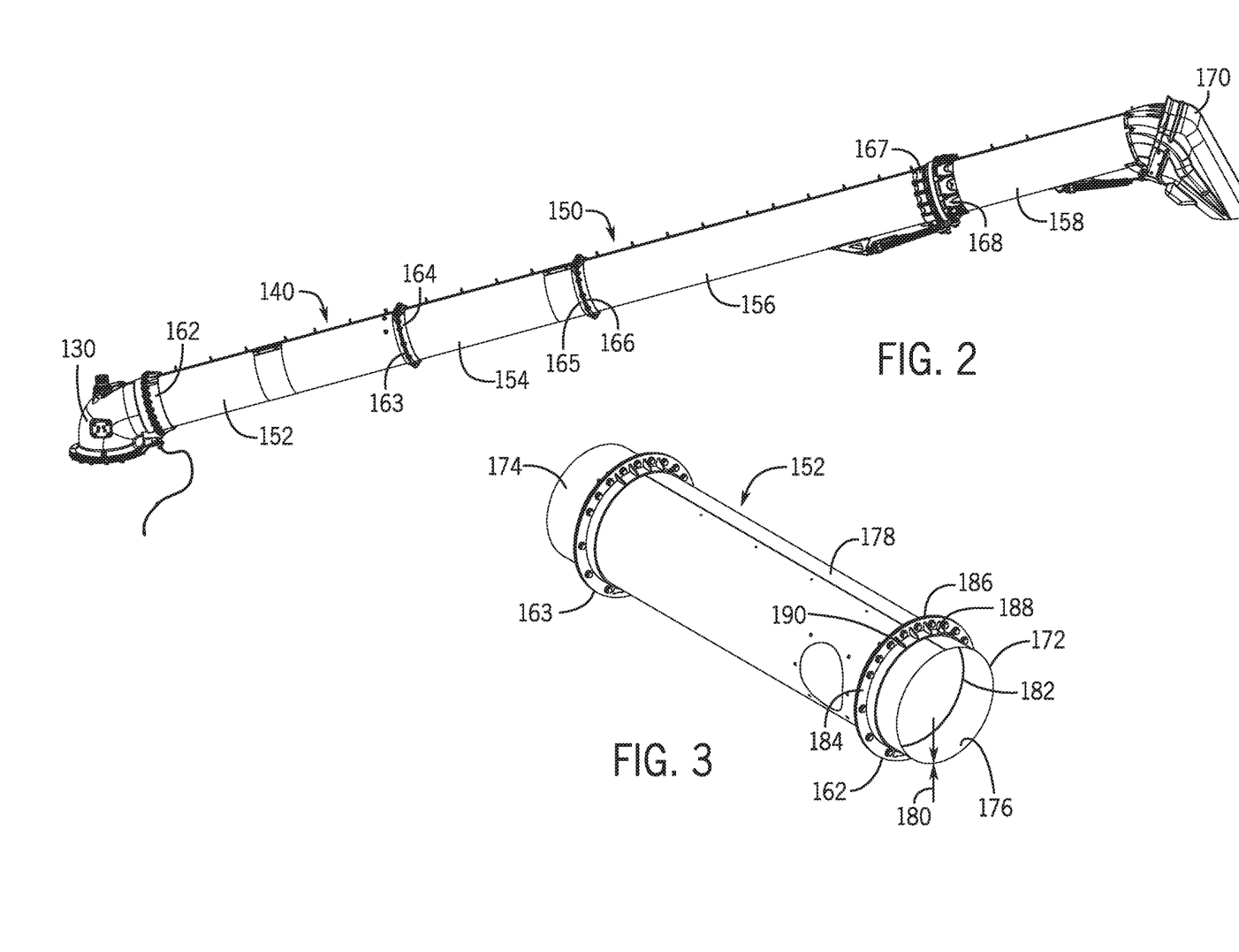
FIG. 2 is an isometric view of the unloading auger assembly of FIG. 1 according to this disclosure.
FIG. 3 is an isometric view of a housing arrangement portion of the unloading auger assembly of FIG. 2 according to this disclosure.

Reference is now made to FIG. 2, which is an isometric view of a portion of the grain unloading system 102 removed from the harvester 100. The view of FIG. 2 particularly depicts the elbow 130 and housing arrangement 150, as well as a shroud 170 attached to the distal end of the housing arrangement 150.

As shown, the housing arrangement 150 is formed by a series of tube portions 152, 154, 156, 158, each with one or more mounting flange structures 162, 163, 164, 165, 166, 167, 168 that enable the tube portions 152, 154, 156, 158 to be bolted together and the housing arrangement 150 to be bolted to the elbow 130. As described in greater detail below, the mounting flange structures 162, 163, 164, 165, 166, 167, 168 are disposed about and secured to the outer surfaces of the tube portions 152, 154, 156, 158 with laser welds. In some embodiments, one or more of the mounting flange structures 162, 163, 164, 165, 166, 167, 168 (particularly structures 167, 168) may be secured to the tube portions 152, 154, 156, 158 with mechanisms other than laser welding, such as with bolts.

In one embodiment, the housing arrangement 150 is formed by three or four tube portions 152, 154, 156, 158, while in other embodiments, the housing arrangement 150 is formed by fewer or more tube portions 152, 154, 156, 158 that are fastened together to form the length of the housing arrangement 150. As one example, a first tube portion 152 is fastened (e.g., with bolts or other fasteners) by a first mounting flange structure 162 to the elbow 130; a second tube portion 154 is fastened to the first tube portion 152 by securing a second mounting flange structure 163 of the first tube portion 152 to a first mounting flange structure 164 of the second tube portion 154; a third tube portion 156 is fastened to the second tube portion 154 by securing a second mounting flange structure 165 of the second tube portion 154 to a first mounting flange structure 166 of the third tube portion 156; and a fourth tube portion 158 is fastened to the third tube portion 156 by securing a second mounting flange structure 167 of the third tube portion 156 to a first mounting flange structure 168 of the fourth tube portion 158. The shroud 170 is secured to the end of the fourth tube portion 158.

The tube portions 152, 154, 156, 158 may have any suitable lengths, such as between 1 m to about 4 m. Example thicknesses of the tube portions 152, 154, 156, 158 are described below.

One example tube portion 152 with laser welded mounting flange structures 162, 163 is depicted by the isometric view of FIG. 3. Each tube portion 152 may be generally cylindrical to define a first end 172, a second end 174, an inner surface 176, an outer surface 178, and a thickness 180 between the inner surface 176 and the outer surface 178. Moreover, each tube portion 152 may support one or more mounting flange structures 162, 163. In one example, a first mounting flange structure 162 is secured to the outer surface 178 of the tube portion 152 at the first end 172, and a second mounting flange structure 163 is secured to the outer surface 178 of the tube portion 152 at the second end 174. As described in greater detail below, the mounting flange structures 162, 163 are secured to tube portion 152 with laser welds 182 (one of which is shown), each respectively extending from the inner surface 176 of the tube portion 152, through the thickness 180 of the tube portion 152, and into the respective mounting flange structure 162.

The tube portion 152 may be formed by a unitary tubular body or as a rolled form that is joined at a seam. In one embodiment, the tube portion 152 is formed by a high-strength steel (HSS). A high-strength steel may be categorized has having 300 MPa tensile strength and above. Generally, high-strength steel is low carbon steel with minute amounts of molybdenum, niobium, titanium, and/or vanadium and may also be referred to as high strength alloy steel or high-strength, low-alloy steel. As a result, a high-strength steel may have much higher strengths than mild steels, thereby reducing thickness and weight in comparison to mild steel parts. As discussed below, the tube portion 152 may have any suitable thickness, such as approximately 2-3 mm or less than 4 mm. In some embodiments, the thickness of the tube portion 152 (and any of the tube portions 154, 156, 158) may be a function of the position of the respective tube portion within the housing arrangement 150. For example, the thicknesses may incrementally decrease from the tube portion 152 at the elbow 130 through the downstream tube portions 154, 156, 158. In one example, the thicknesses of the tube portion 152 may be approximately 3 mm and the last tube portion 158 may be approximately 1 mm with the intervening tube portions 154, 156 having decreasing thicknesses between 1 mm and 3 mm.

Each mounting flange structure 162, 163 is formed by an axial section 184 and a radial section 186 that extends perpendicularly from the axial section 184. The radial section 186 is configured to receive a portion of the laser weld 182 for securement to the tube portion 152, as described below. The axial section 184 defines a series of mounting holes 188 to receive any suitable type of fastener (e.g., bolts) for securement to a cooperating mounting structure, such as mounting flange structures on the elbow (e.g., elbow 130) of the harvester 100 or with mounting flange structures of adjacent tube portions (e.g., portion 154). In some embodiments, the mounting flange structure 162, 163 include gussets or other types of supports 190 in between the radial section 186 and the axial section 184 that function to strengthen and/or support the mounting flange structure 162, 163, e.g., to prevent deformation or cracking. Generally, the gussets 190 are provided in selected circumferential positions around the mounting flange structure 162, 163 in areas that experience high stress, such as along the top and bottom. In other examples, the gussets 190 may be spaced all the way around the mounting flange structure 162, 163. The flange mounting structures 162, 163 may be formed by mild steel, although other materials may be used.

The end view of FIG. 3 additionally depicts the position of a laser weld 182 originating from the inner surface 176 of the tube portion 152, extending through the thickness 180 and outer surface 178 of the tube portion 152, and through an inner surface 185 (see FIG. 7) of the axial section 184 into the mounting flange structure 162, 163 to secure the mounting flange structure 162, 163 to the tube portion 152. A corresponding laser weld may be used to mount a portion or all of the mounting flange structures 162, 163 on each end of the tube portions 152. Additional details regarding the laser welds 182 are provided below.

Figure 4:
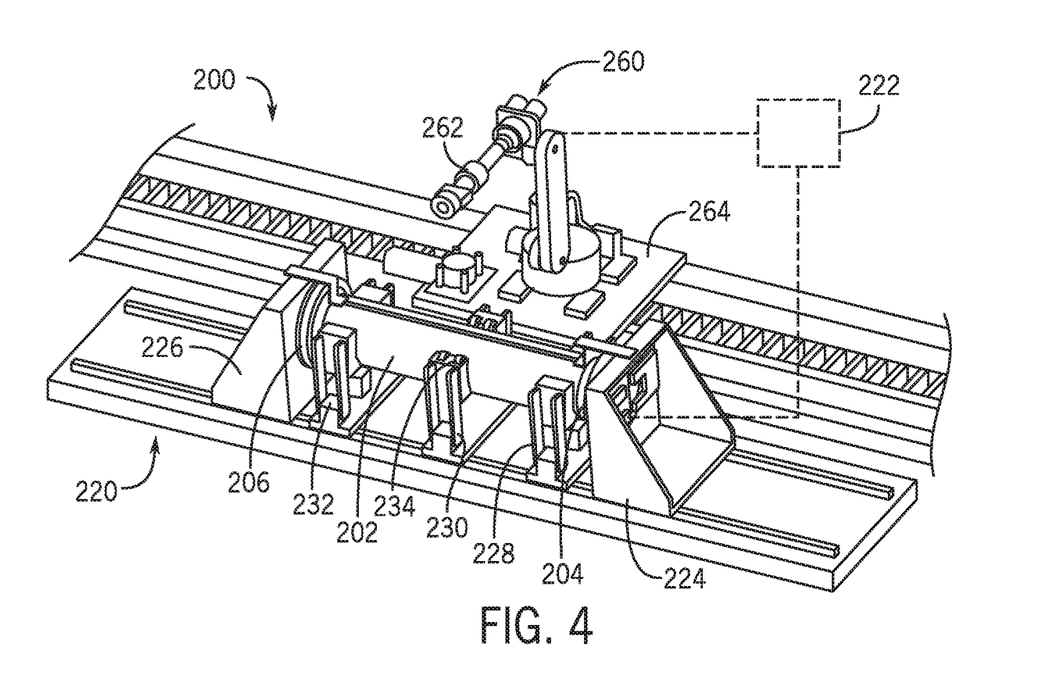
FIGS. 4-6 are a view of a welding system for forming the housing arrangement portion of FIG. 3 according to this disclosure.
Figure 5:
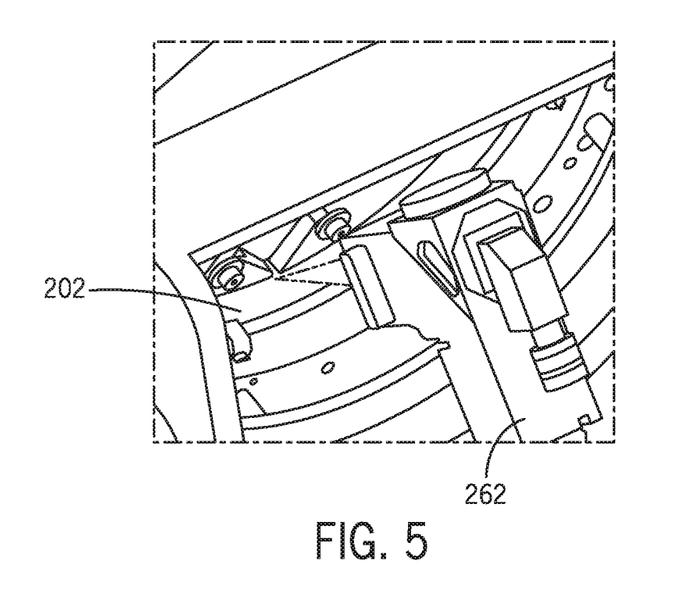
Figure 6:
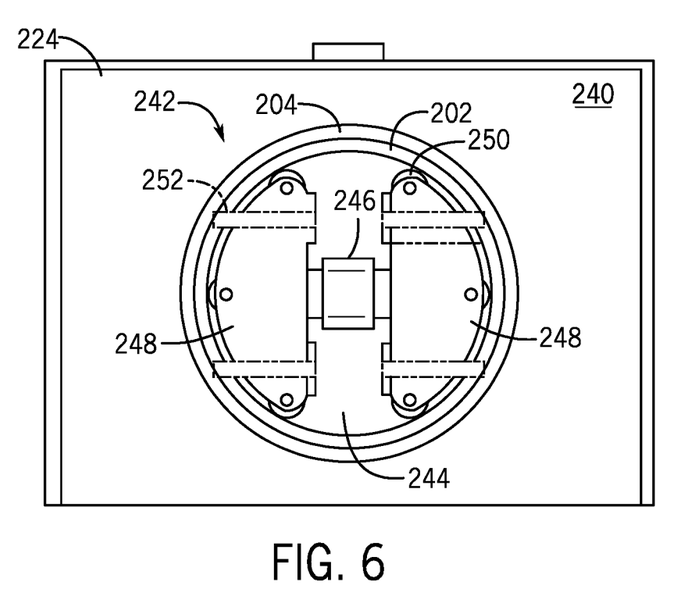

The views of FIGS. 4-6 depict aspects of a welding system 200 that may be utilized to form the welds described above. The welding system 200 and associated processing steps described below may be used to join mounting flange structures and tube portions for any of the housing arrangement portions of the unloading auger assembly described herein. Although one example of the welding system 200 and associated processing steps are described below, alternative or additional steps and mechanisms may be used.

Referring initially to FIG. 4, the welding system 200 includes a housing support device 220 that receives, supports, and manipulates a tube portion 202 and a mounting flange structures 204, 206 (representing any of the tube portions and flange structures described herein). The welding system 200 further includes a laser apparatus 260 that interacts with the tube portion 202 and mounting flange structures 204, 206. Further, a welding system controller 222 is coupled to generate command signals for the housing support device 220 and/or the laser apparatus 260 to facilitate the welding operation based on device generated instructions and/or operator instructions provided via an appropriate operator interface.

In one example, the housing support device 220 includes one or more end brackets 224, 226 and one or more longitudinal supports 228, 230, 232. In this example, the housing support device 220 includes two end brackets 224, 226 and three longitudinal supports 228, 230, 232. The first end bracket 224 supports a first end of the tube portion 202 and the first mounting flange structure 204, and the second end bracket 226 supports a second end of the tube portion 202 and the second mounting flange structure 206. Additional information regarding the end brackets 224, 226 is discussed below.

The longitudinal supports 228, 230, 232 are arranged long the length of the tube portion 202 and engage the outer surface of the tube portion 202. In one example, one or more of the longitudinal supports 228, 230, 232 include a rotational drive 234. The rotational drive 234, based on commands from the welding system controller 222, functions to engage the tube portion 202 such that the tube portion 202 rotates about a longitudinal axis as the laser apparatus 260 welds the tube portion 202 and mounting flange structures 204, 206.

One of the end brackets 224 is depicted in the views of FIGS. 5 and 6, and the other end bracket 226 may be similarly configured. In one example, the end bracket 224 includes a body 240 and a clamping apparatus 242. The body 240 forms an aperture 244 and generally supports the respective end of the tube portion 202 and the mounting flange structures 204, 206.

The clamping apparatus 242 is formed by a clamp cylinder 246, expansion blocks 248, a series of rollers 250, and bearing rails 252. Generally, the expansion blocks 248 are arranged within the interior of the tube portion 202 at a longitudinal position corresponding to the position of the mounting flange structure 204 arranged on the outer surface of the tube portion 202. In this example, two expansion blocks 248 are provided, although other examples may have a different number or arrangement of blocks 248. The expansion blocks 248 are supported by the bearing rails 252 and clamp cylinder 246 for lateral or axial movement away from the center of the tube portion 202. The rollers 250 are arranged on the expansion blocks 248 to enable the expansion blocks 248 to engage the inner surface of the tube portion 202 during the rotation discussed below.

During operation, the clamp cylinder 246, as a hydraulic actuator, receives fluid pressure from a source, typically controlled by the welding system controller 222, to extend the cylinder 246 such that the expansion blocks 248 are pressed away from the longitudinal center and pressed against the inner surface of the tube portion 202. The pressing of the expansion blocks 248 functions to expand the circumference tube portion 202, thereby pressing the outer surface of the tube portion 202 against the inner surface of the mounting flange structure 204 and creating a tighter or closer interface between the tube portion 202 and the mounting flange structure 204. Specifically, the expansion blocks 248 results in an interface between the tube portion 202 and the mounting flange structure 204 as a physically abutting, intimate engagement that extends 360° along the outer surface of the tube portion 202 and the inner surface of mounting flange structure 204. As a result, the clamping apparatus 242 creates a more suitable or amenable interface between the two surfaces to receive a laser weld, as described in greater detail below.

Referring additionally to FIGS. 4 and 5, the laser apparatus 260 is formed by a laser device 262 and a frame 264 that supports and manipulates the laser device 262. After engaging the clamping apparatus 242, the laser apparatus 260 is utilized to form the laser weld. In one example, the laser device 262 is manipulated relative to the frame 264 to appropriately position the laser device 262 relative to the end of the tube portion 202 clamped to the mounting flange structure 204. The laser device 262 is positioned to generate the laser beam at a position on the inner surface of the tube portion 202, proximate to the clamped portion of the tube portion 202. Based on commands from the laser welding system controller 222, the tube portion 202 and mounting flange structure 204 are rotated by the drive 234, and the laser device 262 is powered to generate a laser beam. The rollers 250 of the expansion block 248 enable the tube portion 202 to rotate relative to the end brackets 224, 226.

As the laser beam strikes the inner surface of the tube portion 202, a laser weld is formed between the tube portion 202 and the mounting flange structure 204. In particular, the weld is generated as the energy from the laser beam is transferred into heat at the inner surface of the tube portion 202, through the thickness and to the outer surface of the tube portion 202, and through the inner surface of the mounting flange structure 204 into the interior of the mounting flange structure 204 such that the mounting flange structure 204 and tube portion 202 are fused together. As noted above, the tight interface created by the expansion blocks 248 enables a secure laser weld.

The operational parameters of the laser device 262 may vary based on a number of considerations. In one example, the operational parameters of the laser device 262 include the following: 4.8 kW, 0 mm defocus, positioned 40° from vertical approximately 18 inches from the inner surface, and 20 Hz wobble at a 2 mm amplitude. The rotational drive 234 may rotate the tube portion at a rate of approximately 15 mm/s. In one embodiment, the laser apparatus 260 may form the laser weld in two passes, such as two weld lines positioned approximately 1.5 mm apart from one another at a width to effectively join the two weld lines.

In addition to the laser parameters of the laser device 262, the resulting weld from the welding operation may depend on the nature of the tube portion 202 and/or mounting flange structures 204, 206. As noted above, the tube portion 202 may have any suitable thickness, such as approximately 1-3 mm or less than 4 mm. The weld extends through the thickness of tube portion 202 and into the mounting flange structures 204, 206. In one example, the weld may extend approximately 2 mm into the inner surface of the mounting flange structures 204, 206.

After the mounting flange structure 204 is welded to the tube portion 202, the laser apparatus 260 is repositioned proximate to the second end of the tube portion 202 on which another mounting flange structure 206 is positioned and clamped, as described above. The laser weld process is repeated on the second end of the tube portion 202 such that a second mounting flange structure 206 is welded to the tube portion 202. In other embodiments, the tube portion 202 is maintained in a stationary position, and the laser apparatus 260 and/or laser device 262 is manipulated to form the weld.

Subsequently, the housing arrangement (e.g., housing arrangement 150) is assembled. In particular, a first tube portion 202 is mounted to the appropriate unloading source (e.g., an elbow, grain tank, or the like) on the harvester (e.g., harvester 100) by bolting the first mounting flange structure 204. Additional tube portions are bolted together via the respective flange mounting structures to form the extent of the housing arrangement. As noted above, an auger is positioned within the housing arrangement to form the unloading auger assembly.

Figure 7:
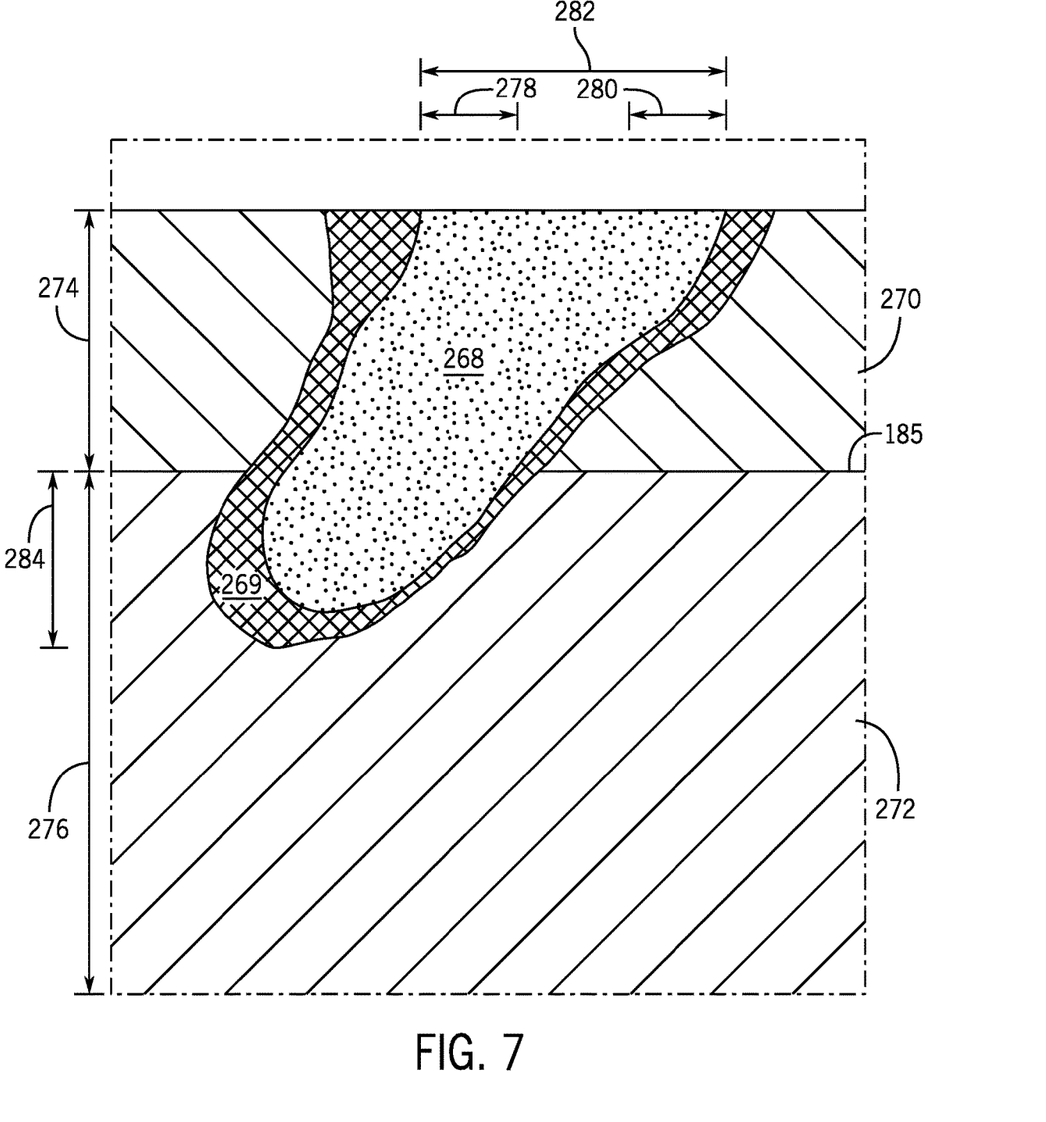
FIG. 7 is a cross-sectional view of a weld formed by the welding system of FIG. 4 according to this disclosure.

Reference is additionally made to FIG. 7, which is a cross-sectional view of a weld 268 at the interface between an example tube portion 270 and mounting flange structure 272 (e.g., representing any of the tube portions and mounting flange structures discussed herein). Generally, the laser weld 268 is narrower and more localized, as compared to other types of welds, resulting from the more focused laser and smaller heat-affected zone (reflected by portion 269). This is particularly advantageous according to the present disclosure in which the weld 268 is formed from the side of the tube portion 270, through relatively thinner material of the tube portion 270, and into the relatively thicker material of the mounting flange structure 272. As introduced above, the tube portion 270 may have a thickness 274 of less than 4 mm, such as 1-3 mm, while the mounting flange structure 272 may be have a thickness 276 that is greater than the thickness 274 of the tube portion 270. In one example, the mounting flange structure 272 may have a thickness 276 of greater than 5 mm, such as 10-20 mm, or even greater.

The view of the FIG. 7 also reflects example characteristics of the weld 268. As noted above, the weld 268 may be formed by two weld lines 278, 280 (reflected by the laser beam widths on the surface of the tube portion 270), e.g., as a result of two rotational passes along the interior of the tube portion 270 during the welding process. Considering the spacing of the two weld lines 278, 280, the resulting weld 268 merges into the weld 268 with an overall width 282 of less than 5 mm wide on the inner surface of the tube portion 202. The heat-affected zone 269 extending beyond the weld 268 may be slightly larger, but the two weld lines 278, 280 result in a single weld 268 to join the tube portion 270 and mounting flange structure 272. The view of FIG. 7 additionally depicts the progression of the weld 268 through the tube portion 270 and into the mounting flange structure 272. Upon passing through thickness 274 of the tube portion 270, this results in a laser weld width of approximately 3 mm on the inner surface of the mounting flange structure 272 and penetrates within the mounting flange structure 272 to a depth or thickness 284 of less than 2 mm, as one example. Other weld widths and thicknesses may be provided. As noted above, the operational parameters and other characteristics of the welding system 200 and the welding process may vary.

Accordingly, the manufacturing and assembly process steps discussed above may be embodied as a method for forming a housing arrangement of an unloading auger assembly. Additionally, the embodiments discussed herein provide a housing arrangement of an unloading auger assembly with improved performance and durability. In particular, the auger housing arrangement is formed by laser welding mounting flange structures onto a series of tube portions from the respective inner surface of the tube portions and bolting the laser welded flange structures to assemble the tube portions into the housing arrangement.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

Also, the following examples are provided, which are numbered for convenient reference, as follows:

1. An auger assembly for transporting material for an agricultural work vehicle, comprising: an auger; and a housing arrangement having an interior that houses the auger such that rotation of the auger within the housing arrangement is configured to transport the material through the housing arrangement, the housing arrangement comprising a series of tube portions including at least a first tube portion and a second tube portion, each respective tube portion of the series of tube portions having a first end, a second end, an inner surface, an outer surface, and a thickness between the inner surface and the outer surface; and at least one mounting flange structure, including a first mounting flange structure secured to the outer surface of the first tube portion by a first laser weld extending from the inner surface of the first tube portion, through the thickness of the first tube portion, and into the first mounting flange structure.

2. The auger assembly of example 1, wherein the first mounting flange structure is secured proximate to the first end of the first tube portion and the at least one mounting flange structure further includes a second mounting flange structure secured proximate to the second end of the first tube portion by a second laser weld extending from the inner surface of the first tube portion, through the thickness of the first tube portion, and into the second mounting flange structure.

3. The auger assembly of example 2, wherein the first mounting flange structure is configured to receive a first set of fasteners to support the housing arrangement on the agricultural work vehicle, wherein the at least one mounting flange structure further includes a third mounting flange structure secured proximate to the first end of the second tube portion by a third laser weld extending from the inner surface of the second tube portion, through the thickness of the second tube portion, and into the third mounting flange structure, and wherein the second and third mounting flange structures are configured to be aligned and receive a second set of fasteners for securing the first tube portion to the second tube portion.

4. The auger assembly of example 3, wherein the at least one mounting flange structure further includes a fourth mounting flange structure secured proximate to the second end of the second tube portion by a fourth laser weld extending from the inner surface of the second tube portion, through the thickness of the second tube portion, and into the fourth mounting flange structure, and wherein the series of tube portions further includes a third tube portion and the at least one mounting flange structure further includes a fifth mounting flange structure secured proximate to the first end of the third tube portion by a fifth laser weld extending from the inner surface of the third tube portion, through the thickness of the third tube portion, and into the fifth mounting flange structure, and wherein the fourth and fifth mounting flange structures are configured to be aligned and receive a third set of fasteners for securing the second tube portion to the third tube portion.

5. The auger assembly of example 1, wherein the first tube portion is formed by high-strength steel.

6. The auger assembly of example 1,wherein the first laser weld is less than approximately 5 mm wide. 7. The auger assembly of claim 1, wherein the first tube portion has a thickness of less than approximately 4 mm.

8. The auger assembly of example 1, wherein the first laser weld is formed by two laser weld lines.

9. The auger assembly of example 1, wherein the first mounting flange structure is formed by a radial section that forms the first laser weld with the first tube portion and an axial section that defines a series of fastener holes.

10. The auger assembly of example 9, wherein the first mounting flange assembly further includes at least one gusset in between the radial section and the axial section.

11. A method of forming a housing arrangement of an auger assembly for transporting material on an agricultural work vehicle, the method comprising: providing a first tube portion having a first end, a second end, an inner surface, an outer surface, and a thickness between the inner surface and the outer surface; positioning a first mounting flange structure on the outer surface of the first tube portion proximate to the first end; arranging a laser apparatus with a laser device proximate to the first end of the first tube portion such that the laser device is oriented toward the inner surface of the first tube portion; and generating a laser beam with the laser device onto the inner surface of the first tube portion to form a first laser weld extending from the inner surface of the first tube portion, through the thickness of the first tube portion, and into the first mounting flange structure.

12. The method of example 11, further comprising positioning a clamping apparatus within the first tube portion and actuating at least one expansion block of the clamping structure to press the first tube portion against the first mounting flange structure when generating the laser beam to form the first laser weld.

13. The method of example 12, further comprising rotating the tube portion and the mounting flange structure while keeping the laser apparatus stationary to form the first laser weld along at least one complete revolution of the first tube portion and the first mounting flange structure.

14. The method of example 13, further comprising continuing to rotate the first tube portion and first mounting flange structure to form the first laser weld along two complete revolutions of the first tube portion and the first mounting flange structure.

15. The method of example 11, further comprising positioning a second mounting flange structure on the outer surface of the first tube portion proximate to the second end; arranging the laser apparatus with the laser device proximate to the second end of the first tube portion such that the laser device is oriented toward the inner surface of the first tube portion; generating the laser beam on the inner surface of the first tube portion to form a second laser weld extending from the inner surface of the first tube portion, through the thickness of the first tube portion, and into the second mounting flange structure; providing a second tube portion having a first end, a second end, an inner surface, an outer surface, and a thickness between the inner surface and the outer surface; positioning a third mounting flange structure on the outer surface of the second tube portion proximate to the first end; arranging the laser apparatus with the laser device proximate to the first end of the second tube portion such that the laser device is oriented toward the inner surface of the second tube portion; generating the laser beam on the inner surface of the second tube portion to form a third laser weld extending from the inner surface of the second tube portion, through the thickness of the second tube portion, and into the third mounting flange structure; rotating the second tube portion and the third flange structure while keeping the laser apparatus stationary to form the third laser weld along at least one complete revolution of the second tube portion and the third mounting flange structure; and securing the first tube portion to the second tube portion by bolting the second mounting flange structure to the third mounting flange structure.

As will be appreciated by one skilled in the art, certain aspects of the disclosed subject matter may be embodied as a method, system (e.g., a work vehicle control system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that may contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Aspects of certain embodiments are described herein may be described with reference to flowchart illustrations and/or block diagrams of methods, apparatus (systems) and computer program products according to embodiments of the invention. It will be understood that each block of any such flowchart illustrations and/or block diagrams, and combinations of blocks in such flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block (or otherwise described herein) may occur out of the order noted in the figures. For example, two blocks shown in succession (or two operations described in succession) may, in fact, be executed substantially concurrently, or the blocks (or operations) may sometimes be executed in the reverse order, depending upon the functionality involved. It will also be noted that each block of any block diagram and/or flowchart illustration, and combinations of blocks in any block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. An auger assembly for transporting material for an agricultural work vehicle, comprising:
    an auger; and
    a housing arrangement having an interior that houses the auger such that rotation of the auger within the housing arrangement is configured to transport the material through the housing arrangement, the housing arrangement comprising:
        a series of tube portions including at least a first tube portion and a second tube portion, each respective tube portion of the series of tube portions having a first end, a second end, an inner surface, an outer surface, and a thickness between the inner surface and the outer surface; and
        at least one mounting flange structure being a separate component from the tube portions, including a first mounting flange structure having an inner surface disposed about the first tube portion and secured to the outer surface of the first tube portion by a first laser weld extending sequentially from the inner surface of the first tube portion, through the thickness of the first tube portion, through the outer surface of the first tube portion, and through the inner surface of the first mounting flange structure.

2. The auger assembly of claim 1, wherein the first mounting flange structure is secured proximate to the first end of the first tube portion and the at least one mounting flange structure further includes a second mounting flange structure secured proximate to the second end of the first tube portion by a second laser weld extending from the inner surface of the first tube portion, through the thickness of the first tube portion, and into the second mounting flange structure.

3. The auger assembly of claim 2, wherein the first mounting flange structure is configured to receive a first set of fasteners to support the housing arrangement on the agricultural work vehicle;
wherein the at least one mounting flange structure further includes a third mounting flange structure secured proximate to the first end of the second tube portion by a third laser weld extending from the inner surface of the second tube portion, through the thickness of the second tube portion, and into the third mounting flange structure; and
wherein the second and third mounting flange structures are configured to be aligned and receive a second set of fasteners for securing the first tube portion to the second tube portion.

4. The auger assembly of claim 3, wherein the at least one mounting flange structure further includes a fourth mounting flange structure secured proximate to the second end of the second tube portion by a fourth laser weld extending from the inner surface of the second tube portion, through the thickness of the second tube portion, and into the fourth mounting flange structure; and
wherein the series of tube portions further includes a third tube portion and the at least one mounting flange structure further includes a fifth mounting flange structure secured proximate to the first end of the third tube portion by a fifth laser weld extending from the inner surface of the third tube portion, through the thickness of the third tube portion, and into the fifth mounting flange structure; and
wherein the fourth and fifth mounting flange structures are configured to be aligned and receive a third set of fasteners for securing the second tube portion to the third tube portion.

5. The auger assembly of claim 1, wherein the first tube portion is formed by high-strength steel.

6. The auger assembly of claim 1, wherein the first laser weld is less than 5 mm wide.

7. The auger assembly of claim 1, wherein the first tube portion has a thickness of less than 4 mm.

8. The auger assembly of claim 1, wherein the first laser weld is formed by two laser weld lines.

9. The auger assembly of claim 1, wherein the first mounting flange structure is formed by a radial section that forms the first laser weld with the first tube portion and an axial section that defines a series of fastener holes.

10. The auger assembly of claim 9, wherein the first mounting flange structure further includes at least one gusset in between the radial section and the axial section.

11. An auger assembly for transporting material for an agricultural work vehicle, comprising:
an auger; and
a housing arrangement having an interior that houses the auger such that rotation of the auger within the housing arrangement is configured to transport the material through the housing arrangement, the housing arrangement comprising:
a series of tube portions including at least a first tube portion having a first end, a second end, an inner surface, an outer surface, and a first thickness between the inner surface and the outer surface, wherein the first tube portion is formed from high-strength steel; and
at least one mounting flange structure, including a first mounting flange structure having an axial portion with an inner surface disposed about the first tube portion and secured to the outer surface of the first tube portion by a first laser weld and a radial section extending from the axial section, wherein the axial section of the first mounting flange structure has a second thickness that is greater than the first thickness of the first tube portion, and wherein the first laser weld extends from the inner surface of the first tube portion, through the thickness of the first tube portion, through the outer surface of the first tube portion, and through the inner surface of the axial portion of the first mounting flange structure.

12. The auger assembly of claim 11, wherein the first laser weld is less than 5 mm wide.

13. The auger assembly of claim 11, wherein the first thickness of the first tube portion is less than 4 mm.

* * * * *